US008477962B2

(12) United States Patent
Cui et al.

(10) Patent No.: US 8,477,962 B2
(45) Date of Patent: Jul. 2, 2013

(54) MICROPHONE SIGNAL COMPENSATION APPARATUS AND METHOD THEREOF

(75) Inventors: Weiwei Cui, Yongin-si (KR); Ki Wan Eom, Suwon-si (KR); Hyung-Joon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 12/843,022

(22) Filed: Jul. 24, 2010

(65) Prior Publication Data

US 2011/0051955 A1 Mar. 3, 2011

(30) Foreign Application Priority Data

Aug. 26, 2009 (KR) ........................ 10-2009-0079018

(51) Int. Cl.
*H04B 15/00* (2006.01)

(52) U.S. Cl.
USPC ............ 381/94.1; 381/71.1; 381/92; 704/226

(58) Field of Classification Search
USPC .................... 381/71.1, 94.1, 94.7, 92, 95, 96, 381/66, 83, 91, 93, 122; 704/200.1, 219, 704/226, 233
See application file for complete search history.

(56) References Cited

U.S. PATENT DOCUMENTS

| | | | | |
|---|---|---|---|---|
| 7,248,708 | B2 | 7/2007 | Vaudrey et al. | |
| 7,613,310 | B2 * | 11/2009 | Mao | 381/94.7 |
| 7,657,038 | B2 * | 2/2010 | Doclo et al. | 381/94.1 |
| 2003/0040908 | A1 | 2/2003 | Yang et al. | |
| 2003/0055627 | A1 | 3/2003 | Balan et al. | |
| 2007/0055505 | A1 * | 3/2007 | Doclo et al. | 704/226 |
| 2007/0276660 | A1 | 11/2007 | Pinto | |
| 2008/0059163 | A1 | 3/2008 | Ding et al. | |
| 2008/0069372 | A1 * | 3/2008 | Zhang et al. | 381/92 |
| 2008/0159568 | A1 * | 7/2008 | Asada et al. | 381/150 |
| 2009/0034752 | A1 * | 2/2009 | Zhang et al. | 381/92 |
| 2009/0164212 | A1 * | 6/2009 | Chan et al. | 704/226 |
| 2009/0299742 | A1 * | 12/2009 | Toman et al. | 704/233 |
| 2009/0316923 | A1 * | 12/2009 | Tashev et al. | 381/66 |

FOREIGN PATENT DOCUMENTS

| | | | |
|---|---|---|---|
| JP | 2000-312395 | A | 11/2000 |
| JP | 2001-175298 | A | 6/2001 |
| JP | 2004-64584 | A | 2/2004 |
| JP | 2004-187283 | A | 7/2004 |
| JP | 2006-84928 | A | 3/2006 |
| JP | 2006-217649 | A | 8/2006 |
| JP | 2007-147732 | A | 6/2007 |
| JP | 2007-180896 | A | 7/2007 |
| JP | 2008-35259 | A | 2/2008 |
| JP | 2008-311866 | A | 12/2008 |
| KR | 10-2006-0051582 | A | 5/2006 |
| KR | 10-2009-0037845 | A | 4/2009 |

* cited by examiner

*Primary Examiner* — Vivian Chin
*Assistant Examiner* — Friedrich W Fahnert
(74) *Attorney, Agent, or Firm* — NSIP Law

(57) ABSTRACT

A microphone signal compensation apparatus includes a plurality of audio input units to respectively receive a target signal, each audio input unit of the plurality of audio input units including a microphone; a constant filter unit to selectively apply a constant filtering calibration scheme to signals output by the plurality of audio input units to compensate for a difference in at least one characteristic among the audio input units, the constant filtering calibration scheme being estimated from an average value of a ratio of a desired signal to a reference signal among the signals output by the plurality of audio input units; and a noise remover to remove noise from the signals processed by the constant filter unit, and to separate the target signal from the signals from which the noise has been removed.

16 Claims, 6 Drawing Sheets

MICROPHONE SIGNAL COMPENSATION APPARATUS AND METHOD THEREOF

CROSS-REFERENCE TO RELATED APPLICATION

This application claims the benefit under 35 U.S.C. §119 (a) of Korean Patent Application No. 10-2009-0079018, filed on Aug. 26, 2009, in the Korean Intellectual Property Office, the entire disclosure of which is incorporated herein by reference.

BACKGROUND

1. Field

The following description relates to a microphone signal compensation apparatus and method thereof, and more particularly, to a microphone signal compensation apparatus and method thereof that compensates for a difference in a characteristic for a microphone array including a plurality of microphones.

2. Description of Related Art

Technologies for microphone array-based speech enhancement and Automatic Speech Recognition (ASR) have been researched to improve Voice User Interface (VUI). A dual microphone array helps reduce directional interference, and may be equipped in pocket-size devices, such as Personal Digital Assistants (PDAs) or mobile phones.

Microphone arrays for enhancing a voice separation function and methods of using microphone arrays in conjunction with speech recognizers are primarily based on a Generalized Sidelobe Canceller (GSC) framework. Various modified examples have been proposed to overcome model errors due to a location of a target speaker, an acoustic response, or microphone characteristics. In particular, when a location of a microphone is uncertain, speech leakage may be reduced by incorporating multiple linear constraints in a design of a fixed spatial pre-processor.

To compensate for a channel mismatch using a self-calibration scheme, various methods have been proposed to develop robust superdirective beamformers based on correlation analysis of signals and to increase statistic values of microphone characteristics.

Although these methods may reduce speech distortion, alternately updating coefficients of an adaptive filter of the self-calibration scheme and Adaptive Noise Cancellation (ANC) in an algorithm based on the GSC framework is a relatively complex process. In addition, a small-sized array may be sensitive to a difference in a characteristic among microphones; accordingly, a greater number of microphones may be used to improve noise reduction performance, thereby incurring high costs. Moreover, calculation may be performed in each of the microphones, increasing calculation loads. In other words, performance of a GSC framework is generally inferior to a simple Delay-and-Sum Beamformer (DSB) in speech recognition.

People are capable of focusing on only a desired sound among mixed sounds. Based on such an auditory system, a variety of noise removal technologies have been developed. Among these technologies, most implement noise removal schemes based on a person's ability to recognize which sound comes from which direction and distinguish a sound coming from a desired direction to listen specifically to the desired sound. In a person's binaural system, a direction from which a sound is received may be determined based on an Interaural Time Difference (ITD), an Interaural Phase Difference (IPD), an Interaural Intensity Difference (IID), and the like. However, a process of determining a sound generation direction in a microphone array system may be degraded due to a difference in a characteristic among microphones or non-ideal acoustic characteristics (for example, reverberation), thereby deteriorating noise reduction performance and blocking a target speech.

SUMMARY

In one general aspect, a microphone signal compensation apparatus includes a plurality of audio input units to respectively receive a target signal, each audio input unit of the plurality of audio input units including a microphone; a constant filter unit to selectively apply a constant filtering calibration scheme to signals output by the plurality of audio input units to compensate for a difference in at least one characteristic among the audio input units, the constant filtering calibration scheme being estimated from an average value of a ratio of a desired signal to a reference signal among the signals output by the plurality of audio input units; and a noise remover to remove noise from the signals processed by the constant filter unit, and to separate the target signal from the signals from which the noise has been removed.

The desired signal may be a first signal output by a first audio input unit among the plurality of audio input units; the reference signal may be an I-th signal output by an I-th audio input unit among the plurality of audio input units; and the constant filter unit may apply, to the I-th signal, a constant filtering calibration scheme that may be represented by the following equation:

$$H_I^{fdc1}(k) = \frac{1}{M}\sum_{m=1}^{M}\frac{X_1(k, m)}{X_I(k, m)}$$

where H(k) denotes the constant filter unit, M denotes a number of frames, $X_1(k, m)$ denotes the first signal, $X_I(k, m)$ denotes the I-th signal, and I≠1.

The desired signal may be an average signal of the signals output by the plurality of audio input units, and may be represented by the following equation:

$$X_d = \frac{1}{L}\sum_{I=1}^{L} X_I(k, m)$$

where $X_d$ denotes the average signal, and L denotes a number of the signals represented by $X_1(k, m)$, $X_2(k, m)$, . . . , and $X_L(k, m)$; and the constant filter unit may apply, to an I-th signal, a constant filtering calibration scheme in which the reference signal is the I-th signal, and which may be represented by the following equation:

$$H_I^{fdc2}(k) = \frac{1}{M}\sum_{m=1}^{M}\frac{X_d(k, m)}{X_I(k, m)}$$

where H(k) denotes the constant filter unit, M denotes a number of frames, $X_I(k, m)$ denotes the I-th signal, and I=1, 2, . . . , L.

The constant filter unit may determine the constant filtering calibration scheme by performing a training process in a frequency domain.

Each audio input unit of the plurality of audio input units may include the microphone, an amplifier to amplify a signal received by the microphone, and an Analog-to-Digital Converter (ADC) to convert a signal output by the amplifier from an analog signal to a digital signal.

In another general aspect, a microphone array includes a signal compensation apparatus that includes a plurality of audio input units to respectively receive a target signal, each audio input unit of the plurality of audio input units including a microphone; a constant filter to selectively apply a constant filtering calibration scheme to signals output by the plurality of audio input units to compensate for a difference in at least one characteristic among the audio input units, the constant filtering calibration scheme being estimated from an average value of a ratio of a desired signal to a reference signal among the signals output by the plurality of audio input units; and a noise remover to remove noise from the signals processed by the constant filter unit, and to separate the target signal from the signals from which the noise has been removed.

In another general aspect, a microphone signal compensation method includes outputting, by a plurality of audio input units to respectively receive a target signal, a plurality of signals, each audio input unit of the plurality of audio input units including a microphone; selectively applying a constant filtering calibration scheme to the signals output by the plurality of audio input units to compensate for a difference in at least one characteristic among the audio input units, the constant filtering calibration scheme being estimated from an average value of a ratio of a desired signal to a reference signal among the plurality of signals; removing noise from the signals to which the constant filtering calibration scheme has been applied; and separating the target signal from the signals from which the noise has been removed.

In another general aspect, a computer readable recording medium stores a program to control a computer to perform the microphone signal compensation method described above.

Other features and aspects will be apparent from the following detailed description, the drawings, and the claims.

Figure 1A:
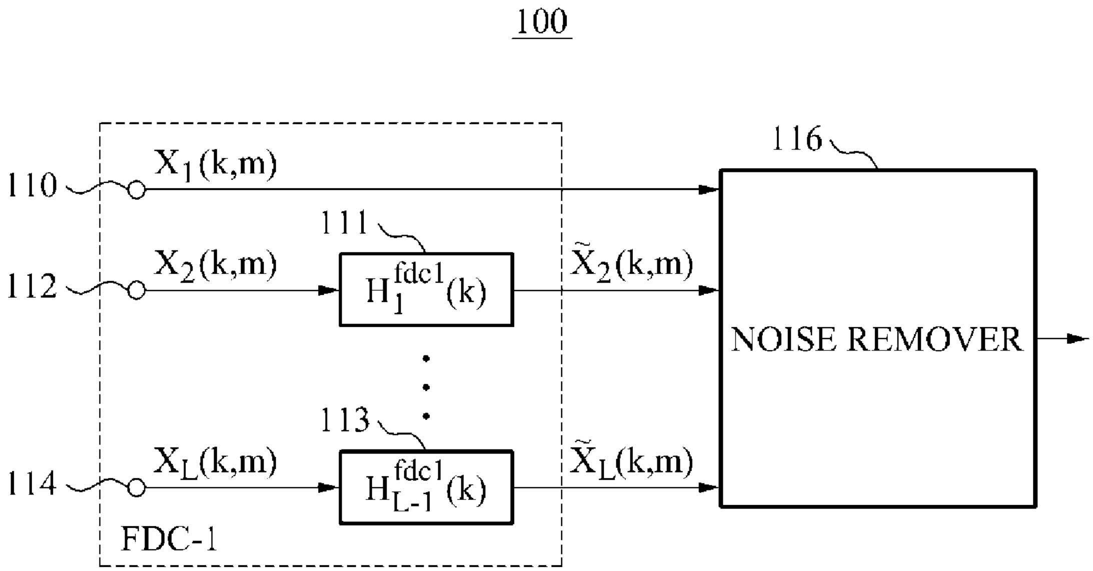
FIG. 1A is a diagram schematically illustrating an example of a signal compensation apparatus of a microphone array.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

FIG. 1A schematically illustrates an example of a signal compensation apparatus 100 of a microphone array.

In the example of FIG. 1A, the signal compensation apparatus 100 includes a plurality of audio input units 110, 112, . . . , 114, a plurality of constant filters 111, . . . , 113, and a noise remover 116. Each audio input unit of the audio input units 110, 112, . . . , 114 may include a microphone to receive a target signal, an amplifier to amplify the received signal, and an Analog-to-Digital Converter (ADC) to convert the amplified signal from an analog signal to a digital signal. The signal compensation apparatus 100 may be included in a microphone array. The constant filters 111, . . . , 113 may estimate a constant filtering calibration scheme according to an average value of a ratio of a desired signal to a reference signal, and may compensate for a difference in a characteristic among signals $X_1(k, m)$, $X_2(k, m)$, . . . , $X_L(k, m)$ which are output by the plurality of audio input units 110, 112, . . . , 114. The noise remover 116 may remove noise from the signals $X_1(k, m)$, $X_2(k, m)$, . . . , $X_L(k, m)$ compensated for by the constant filters 111, . . . , 113, and may separate the target signal.

The terms "constant filter" and "constant filtering calibration scheme" refer to a time-invariant filter having filter coefficients that do not vary with time, as opposed to an adaptive filter having filter coefficients that do vary with time.

Figure 3:
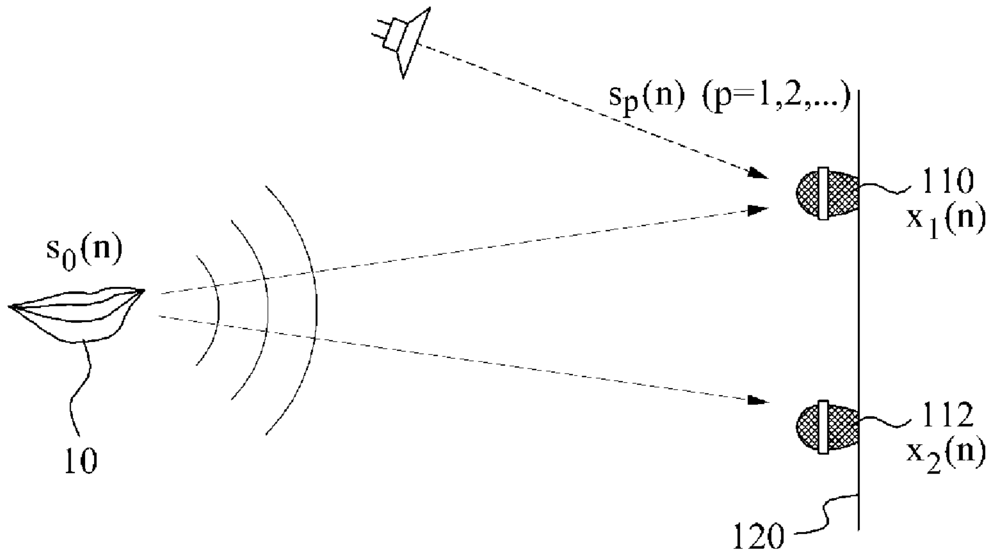
FIG. 3 is a diagram schematically illustrating an example of a microphone array including a signal compensation apparatus.

FIG. 3 illustrates an example of the signal compensation apparatus 100 and a microphone array 120 including the signal compensation apparatus 100.

A signal propagation model of the signal compensation apparatus may be derived from a signal model illustrated in FIG. 3. In FIG. 3, a target signal 10 of interest is received by a microphone array 120 having two microphones, and the microphone array 120 is disposed substantially perpendicular to a source of the target signal 10. The signals output by audio input units 110 and 112 of the microphone array 120 may be referred to as '$x_1(n)$' and '$x_2(n)$' and may be respectively represented by the following Equations 1 and 2:

$$x_1(n) = \sum_p s_p(n) \qquad \text{[Equation 1]}$$

and $$x_2(n) = \sum_p s_p(n - \tau_p) \qquad \text{[Equation 2]}$$

where '$s_0(n)$' (p=0) denotes a target signal, and '$s_p(n)$' (p 0) denotes an interference signal, and $\tau_p$ denotes an Interaural Time Difference (ITD). Short Time Fourier Transforms (STFTs) applied to the signals '$x_1(n)$' and '$x_2(n)$' may be respectively represented by Equations 3 and 4 below:

$$X_1(k, m) = \sum_p S_p(k, m) \qquad \text{[Equation 3]}$$

and

-continued $$X_2(k, m) = \sum_p e^{-j2\pi k\tau_p/N} S_p(k, m) \quad \text{[Equation 4]}$$

and the interference signal may be represented by Equation 5 below:

$$S_p(k, m) = \sum_{n=0}^{N-1} s_p(n)w(n - mN)e^{-j2\pi kn/N} \quad \text{[Equation 5]}$$

where 'w(n)' denotes a finite duration Hamming window, 'm' denotes a number of frames, and 'k' denotes a frequency bin (k=1, 2, . . . , N). The Hamming window is well known in the art, and thus will not be described in detail here.

As an example, one time-frequency bin '$(k_0, m_0)$' may be assumed to be dominated by a single sound source 'p*'. When '$w_k=2\pi k/N$' is substituted into Equation 4 and a parameter '$\tau_p$' denoting a frequency-independent ITD is replaced with a parameter '$\tau_p(k, m)$' denoting a frequency-dependent ITD, the following Equations 6 and 7 may be derived:

$$X_1(k_0,m_0) \approx S_{p^*}(k_0,m_0) \quad \text{[Equation 6]}$$

and $$X_2(k_0,m_0) \approx e^{-jw_k\tau_{p^*}(k_0,m_0)} S_{p^*}(k_0,m_0) \quad \text{[Equation 7]}$$

A noise removal algorithm may be directly applied when microphone characteristics are well matched and there is substantially no reverberation. However, in practice, these conditions are seldom realized. A difference in a characteristic among microphones may arise from a manufacturing process, and reverberation may occur due to multi-path propagation during signal reception. Therefore, a difference in a characteristic among the audio input units may be represented by Equation 8 below:

$$X_2(k_0,m_0) \approx e^{-jw_k\tau_{p^*}(k_0,m_0)} A(k) X_{p^*}(k_0,m_0) \quad \text{[Equation 8]}$$

where 'A(k)' denotes microphone responses, which are generally more constant than sound signals.

To compensate for a difference in a characteristic among microphones, a constant filter may be used to perform filtering, before noise is removed. The constant filter may be estimated by repeatedly performing a constant filtering calibration scheme through a training process, and may be represented by '$H_r(k)$' as shown in Equation 9 below:

$$H_r(k) = \frac{1}{M} \sum_{m=1}^{M} \frac{X_d(k, m)}{X_r(k, m)} \quad \text{[Equation 9]}$$

where 'M' denotes a number of frames, '$X_d(k, m)$' denotes a desired signal, and '$X_r(k, m)$' denotes a reference signal.

A method of compensating for a difference in a characteristic among microphones using the constant filter may include two calibration schemes, a one-channel Frequency-Domain Calibration (FDC-1) scheme and a two-channel Frequency-Domain Calibration (FDC-2) scheme. The FDC-1 scheme may be applied to the signal compensation apparatus 100 shown in FIG. 1A.

In the signal compensation apparatus 100 shown in FIG. 1A, a first signal $X_1(k, m)$ may be defined as a desired signal $X_d(k, m)$, and an I-th signal $X_I(k, m)$ may be defined as a reference signal $X_r(k, m)$. In other words, '$H_r(k)$', '$X_d(k, m)$', and '$X_r(k, m)$' in Equation 9 may be replaced with 'H(k)', '$X_1(k, m)$', and '$X_I(k, m)$' as shown in Equation 10 below:

$$H(k) = \frac{1}{M} \sum_{m=1}^{M} \frac{X_1(k, m)}{X_I(k, m)} \quad \text{[Equation 10]}$$

where I=2, 3, . . . , L.

The above model is generally applicable to an environment with relatively few interference signals.

Figure 1B:
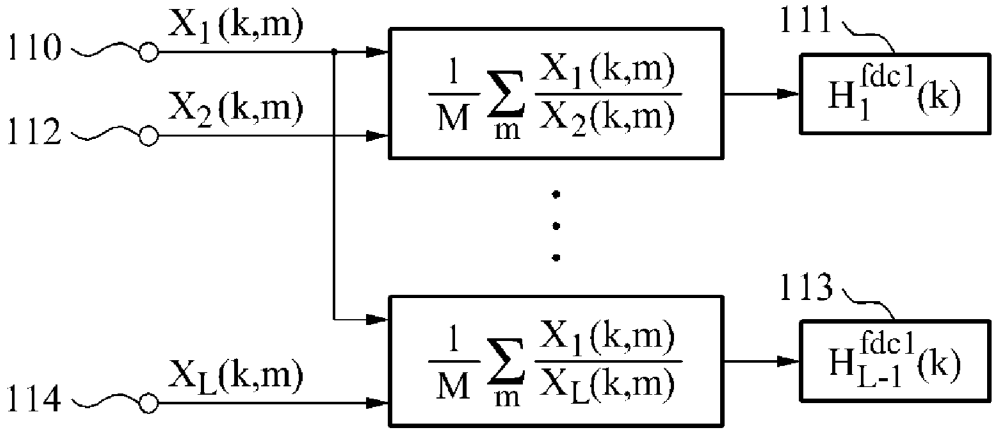
FIG. 1B is a concept diagram illustrating an example of an operation of introducing a constant filter in the signal compensation apparatus of the microphone array illustrated in FIG. 1A.

FIG. 1B illustrates an example of a training process 'FDC-1' of deriving the constant filters 111, . . . , 113 illustrated in FIG. 1A. To derive the constant filters 111, . . . , 113, the training process 'FDC-1' may be performed according to Equation 10, where the first signal $X_1(k, m)$ output by the audio input unit 110 may be defined as a desired signal, and the other signals $X_2(k, m), \ldots, X_L(k, m)$ may be defined as reference signals. Referring the FIG. 1B, the constant filters 111, . . . , 113 may apply constant filtering calibration schemes represented by the following Equations 11 and 12, respectively:

$$H_1^{fdc1}(k) = \frac{1}{M} \sum_{m=1}^{M} \frac{X_1(k, m)}{X_2(k, m)} \quad \text{[Equation 11]}$$

and $$H_{L-1}^{fdc1}(k) = \frac{1}{M} \sum_{m=1}^{M} \frac{X_1(k, m)}{X_L(k, m)} \quad \text{[Equation 12]}$$

A first signal $X_1(k, m)$ output by the audio input unit 110 of the signal compensation apparatus 100 may be output directly to the noise remover 116, without passing through the constant filters 111, . . . , 113. A second signal $X_2(k, m)$ output by the audio input unit 112 of the signal compensation apparatus 100 may pass through the constant filter 111, and the constant filter 111 may compensate for a difference in a characteristic. The second signal $X_2(k, m)$ compensated for by the constant filter 111 may be output to the noise remover 116.

Figure 2A:
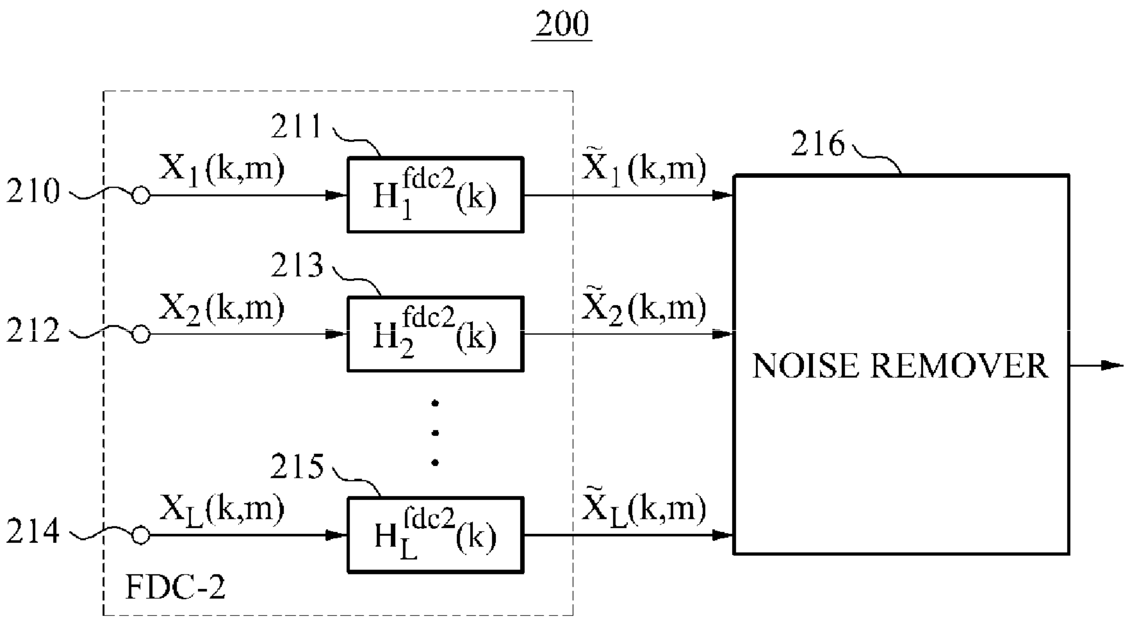
FIG. 2A is a diagram schematically illustrating an example of a signal compensation apparatus of a microphone array.

FIG. 2A schematically illustrates an example of a signal compensation apparatus 200. The signal compensation apparatus 200 of FIG. 2A may be used, for example, in a conference room where both a difference in a characteristic among audio input units and a reverberation occur. In this instance, when a plurality of signals $X_1(k, m), X_2(k, m), \ldots, X_L(k, m)$ have a difference in a characteristic, a constant filter may be applied to each of the signals $X_1(k, m), X_2(k, m), \ldots, X_L(k, m)$. When directional noise occurs in space, a filtering self-calibration scheme may become complex due to an introduction of a large number of adaptive filters. Also, erroneous updating of filter coefficients, in particular, calibration during a pause in speech, may cause desired speech signals to be cancelled.

As illustrated in FIG. 2A, the signal compensation apparatus 200 may include a plurality of audio input units 210, 212, . . . , 214, a plurality of constant filters 211, 213, . . . , 215, and a noise remover 216. As an example, the first signal $X_1(k, m)$ and second signal $X_2(k, m)$ may contain a difference in a characteristic among microphones, as represented by Equations 13 and 14 below:

$$X_1(k_0,m_0) \approx A_1(k) X_{p^*}(k_0,m_0) \quad \text{[Equation 13]}$$

and $$X_2(k_0,m_0) \approx e^{-jw_k\tau_{p^*}(k_0,m_0)} A_2(k) X_{p^*}(k_0,m_0) \quad \text{[Equation 14]}$$

A first constant filter 211 and second constant filter 213 may be estimated from a ratio of the desired signal $X_d(k, m)$ to the reference signal $X_r(k, m)$, and may compensate for a difference in a characteristic between the first signal $X_1(k, m)$ and the second signal $X_2(k, m)$ of the target signal received from the first audio input unit 210 and second audio input unit 212, respectively. Here, the reference signal $X_r(k, m)$ may be the first signal $X_1(k, m)$ or the second signal $X_2(k, m)$. Further, the desired signal $X_d(k, m)$ may be derived by calculating an average signal of the signals $X_1(k, m)$, $X_2(k, m)$, $X_L(k, m)$ according to a Fixed Beam Forming (FBF) and by applying a Fast Fourier Transform (FFT) to the average signal. The desired signal $X_d(k, m)$ may be represented by Equation 15 below:

$$X_d = \frac{1}{L}\sum_{l=1}^{L} X_l(k, m) \quad \text{[Equation 15]}$$

Figure 2B:
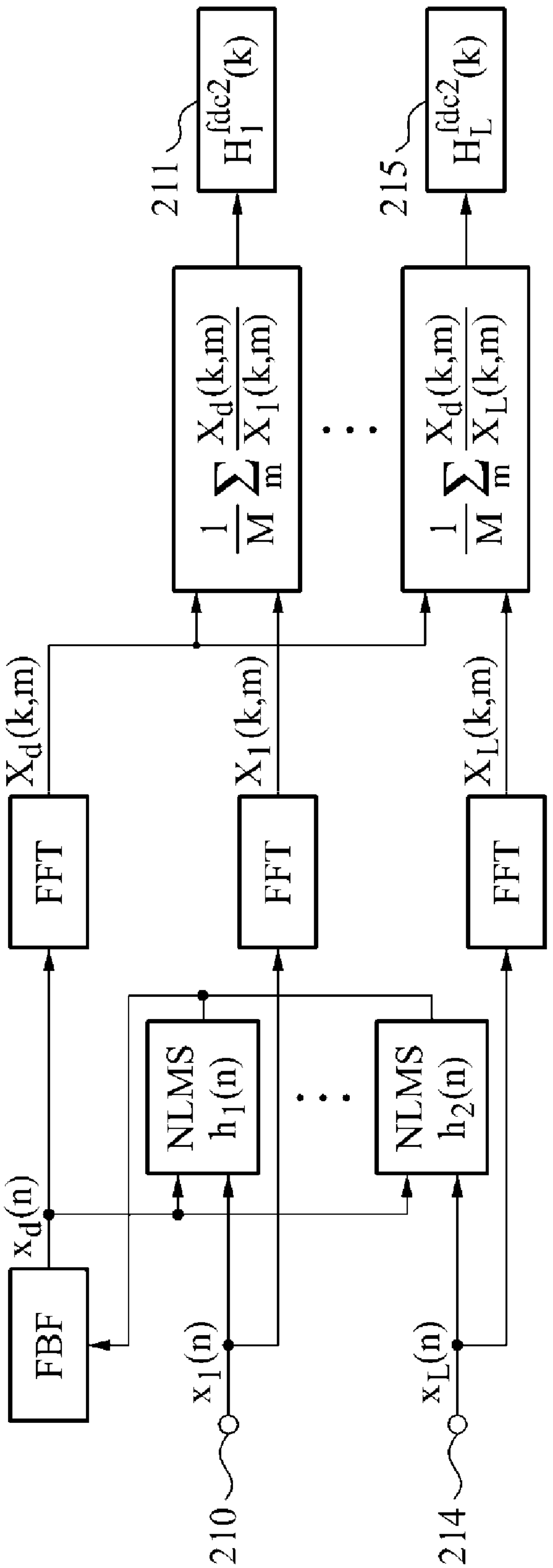
FIG. 2B is a concept diagram illustrating an example of an operation of deriving a constant filter in the signal compensation apparatus of the microphone array illustrated in FIG. 2A.

FIG. 2B illustrates an example of a training process 'FDC-2' of deriving the constant filters 211, 213, . . . , 215 illustrated in FIG. 2A. Referring to FIG. 2B, the constant filters 211, 213, . . . , 215 may be derived by applying a Normalized Least Mean Square (NLMS) algorithm and a FFT to the signals $X_1(k, m)$, $X_2(k, m)$, . . . , $X_L(k, m)$ which are respectively received from the audio input units 210, 212, . . . , 214.

The NLMS algorithm may be calculated by Equation 16 below:

$$e(n) = x_1(n-D) - h(n) * x_2(n) \quad \text{[Equation 16]}$$

$$h(n+1) = h(n) + \frac{\beta e(n) x_1(n-D)}{x_1^2(n-D)}$$

where 'e(n)' denotes an error signal, 'D' denotes a number of samples by which the signal $x_1(n)$ is delayed, '*' denotes a convolution operation, and 'β' denotes a step size in the NLMS algorithm.

As one example, the first signal $X_1(k, m)$ passing through the first constant filter 211 may be used as the reference signal $X_r(k, m)$ in Equation 9. A constant filtering calibration scheme may be applied to the first constant filter 211 according to Equation 17 below:

$$H_1^{fdc2}(k) = \frac{1}{M}\sum_{m=1}^{M} \frac{X_d(k, m)}{X_1(k, m)} \quad \text{[Equation 17]}$$

As another example, the L-th signal $X_L(k, m)$ passing through the L-th constant filter 215 may be used as the reference signal $X_r(k, m)$ in Equation 9. The NLMS algorithm may be applied to the L-th signal $X_L(k, m)$ received from the L-th audio input unit 214 in the same manner as the first signal $X_1(k, m)$, so that the L-th constant filter 215 may be derived. A constant filtering calibration scheme may be applied to the L-th constant filter 215 according to Equation 18 below:

$$H_L^{fdc2}(k) = \frac{1}{M}\sum_{m=1}^{M} \frac{X_d(k, m)}{X_L(k, m)} \quad \text{[Equation 18]}$$

The first signal $X_1(k, m)$ through the L-th signal $X_L(k, m)$ may be used as reference signals for the first constant filter 211 through the L-th constant filter 215, and may be input to the first constant filter 211 '$H_1(k)$' through the L-th constant filter 215 '$H_L(k)$', respectively, as illustrated in FIG. 2A. The first signal $X_1(k, m)$ through the L-th signal $X_L(k, m)$ compensated for by the first constant filter 211 through the L-th constant filter 215 may be output to the noise remover 216.

The noise remover 116 of FIG. 1A and the noise remover 216 of FIG. 2A may compensate for a phase difference by applying a binary mask using a predetermined characteristic of a speech signal source (for example, a sparse arrangement of characteristics in a time-frequency domain), or may compensate for a phase difference or a sensitivity difference according to other noise removal schemes. However, noise removal is not limited to the above scheme, and the above examples may be applicable with various noise removal schemes to compensate for signals.

Figure 4:
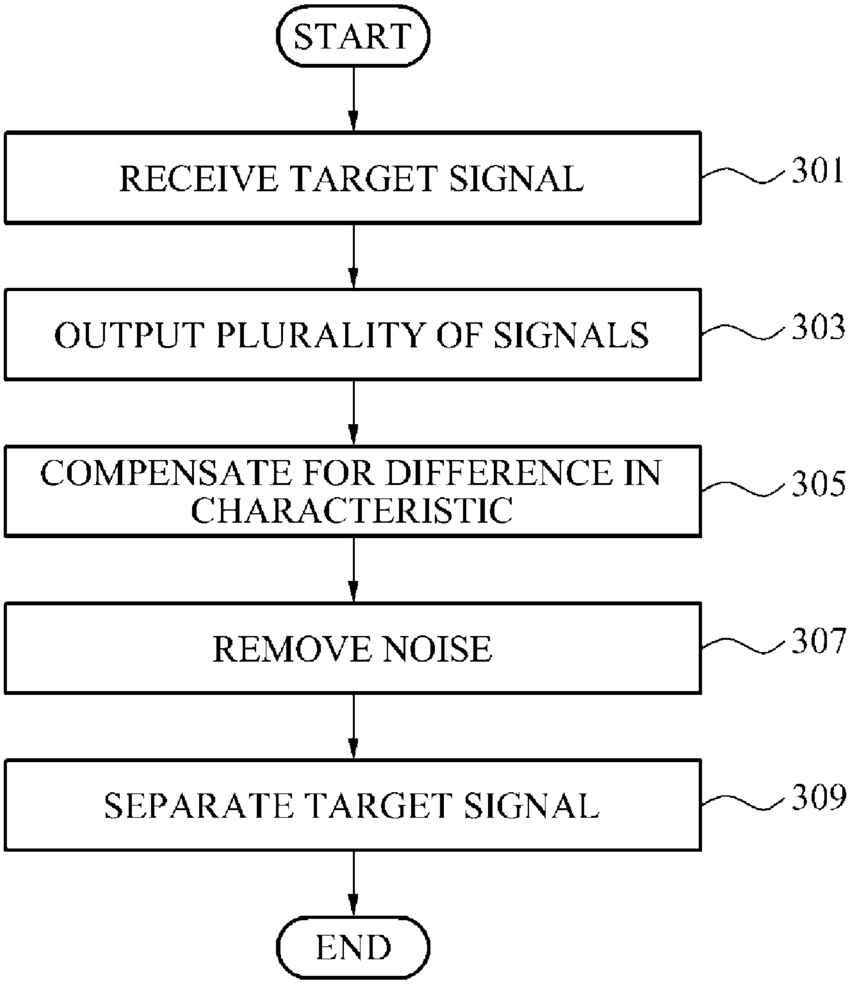
FIG. 4 is a flowchart illustrating an example of a signal compensation method of a microphone array.

FIG. 4 illustrates an example of a signal compensation method of a microphone array.

When a target signal is received from a microphone array in operation 301, a plurality of audio input units output a plurality of signals in operation 303. A constant filtering calibration scheme may be selectively applied to the plurality of signals. For example, if there is a difference in a characteristic among reference signals when relatively few interference signals exist, the constant filtering calibration scheme may not be applied to a signal selected as a desired signal (as an example, see the 'FDC-1' scheme of FIG. 1A). Assuming that each of the plurality of signals have a difference in a characteristic when interference is increased due to a relatively large number of interference signals, the constant filtering calibration scheme may be applied to each of the signals (as an example, see the 'FDC-2' scheme of FIG. 2A).

After the difference in a characteristic is compensated for by the constant filtering calibration scheme denoted by Equation 9 in operation 305, the noise removal algorithm is applied to the plurality of signals to remove noise from the plurality of signals in operation 307. The plurality of signals from which noise is removed in operation 307 are relatively similar to each other, and are separated as a single target signal in operation 309.

In the signal compensation apparatus and method according to the above examples, a constant filtering calibration scheme may be performed in a frequency-domain prior to noise removal, reduce the effect of a difference in a characteristic among microphones, thereby further improving a signal extraction performance. Also, a calibration process may be simplified, improving a signal quality.

The signal compensation method described above according to the examples may be recorded, stored, or fixed in one or more non-transitory computer readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. A microphone signal compensation apparatus, comprising:
- a plurality of audio input units to respectively receive a target signal, each audio input unit of the plurality of audio input units comprising a microphone;
- a constant filter unit to selectively apply a constant filtering calibration scheme to signals output by the plurality of audio input units to compensate for a difference in at least one characteristic among the audio input units, the constant filtering calibration scheme being estimated from an average value of a ratio of a desired signal to a reference signal among the signals output by the plurality of audio input units; and
- a noise remover unit to remove noise from the signals processed by the constant filter unit.

2. The microphone signal compensation apparatus of claim 1, wherein the desired signal is a first signal output by a first audio input unit among the plurality of audio input units;
- the reference signal is an I-th signal output by an I-th audio input unit among the plurality of audio input units; and
- the constant filter unit applies, to the I-th signal, a constant filtering calibration scheme represented by the following equation:

$$H_l^{fdc1}(k) = \frac{1}{M}\sum_{m=1}^{M}\frac{X_1(k, m)}{X_l(k, m)}$$

where H(k) denotes the constant filter unit, M denotes a number of frames, $X_1(k, m)$ denotes the first signal, $X_I(k, m)$ denotes the I-th signal, and I≠1.

3. The microphone signal compensation apparatus of claim 1, wherein the desired signal is an average signal of the signals output by the plurality of audio input units, and is represented by the following equation:

$$X_d = \frac{1}{L}\sum_{l=1}^{L} X_l(k, m)$$

where $X_d$ denotes the average signal, and L denotes a number of the signals represented by $X_1(k, m)$, $X_2(k, m)$, . . . , and $X_L(k, m)$; and the constant filter unit applies, to an I-th signal, a constant filtering calibration scheme in which the reference signal is the I-th signal, and which is represented by the following equation:

$$H_l^{fdc2}(k) = \frac{1}{M}\sum_{m=1}^{M}\frac{X_d(k, m)}{X_l(k, m)}$$

where H(k) denotes the constant filter unit, M denotes a number of frames, $X_I(k, m)$ denotes the I-th signal, and I=1, 2, . . . , L.

4. The microphone signal compensation apparatus of claim 1, wherein the constant filter unit determines the constant filtering calibration scheme by performing a training process in a frequency domain.

5. The microphone signal compensation apparatus of claim 1, wherein each audio input unit of the plurality of audio input units comprises the microphone, an amplifier to amplify a signal received by the microphone, and an Analog-to-Digital Converter (ADC) to convert a signal output by the amplifier from an analog signal to a digital signal.

6. A microphone array comprising a signal compensation apparatus, the signal compensation apparatus comprising:
- a plurality of audio input units to respectively receive a target signal, each audio input unit of the plurality of audio input units comprising a microphone;
- a constant filter unit to selectively apply a constant filtering calibration scheme to signals output by the plurality of audio input units to compensate for a difference in at least one characteristic among the audio input units, the constant filtering calibration scheme being estimated from an average value of a ratio of a desired signal to a reference signal among the signals output by the plurality of audio input units; and
- a noise remover unit to remove noise from the signals processed by the constant filter unit.

7. The microphone array of claim 6, wherein the desired signal is a first signal output by a first audio input unit among the plurality of audio input units;
- the reference signal is an I-th signal output by an I-th audio input unit among the plurality of audio input units; and
- the constant filter unit applies, to the I-th signal, a constant filtering calibration scheme represented by the following equation:

$$H_l^{fdc1}(k) = \frac{1}{M}\sum_{m=1}^{M}\frac{X_1(k, m)}{X_l(k, m)}$$

where H(k) denotes the constant filter unit, M denotes a number of frames, $X_1(k, m)$ denotes the first signal, $X_I(k, m)$ denotes the I-th signal, and I≠1.

8. The microphone array of claim 6, wherein the desired signal is an average signal of signals output by the plurality of audio input units, and is represented by the following equation:

$$X_d = \frac{1}{L}\sum_{l=1}^{L} X_l(k, m)$$

where $X_d$ denotes the average signal, and L denotes a number of the signals represented by $X_1(k, m)$, $X_2(k, m)$, . . . , and $X_L(k, m)$; and the constant filter unit applies, to an I-th signal, a constant filtering calibration scheme in which the reference signal is the I-th signal, and which is represented by the following equation:

$$H_l^{fdc2}(k) = \frac{1}{M}\sum_{m=1}^{M}\frac{X_d(k,m)}{X_l(k,m)}$$

where H(k) denotes the constant filter unit, M denotes a number of frames, $X_l(k, m)$ denotes the I-th signal, and I=1, 2, . . . , L.

9. The microphone array of claim 6, wherein the constant filter unit determines the constant filtering calibration scheme by performing a training process in a frequency domain.

10. The microphone array of claim 6, wherein each audio input unit of the plurality of audio input units comprises the microphone, an amplifier to amplify a signal received by the microphone, and an Analog-to-Digital Converter (ADC) to convert a signal output by the amplifier from an analog signal to a digital signal.

11. A microphone signal compensation method, comprising:

outputting, by a plurality of audio input units to respectively receive a target signal, a plurality of signals, each audio input unit of the plurality of audio input units comprising a microphone;

selectively applying a constant filtering calibration scheme to the signals output by the plurality of audio input units to compensate for a difference in at least one characteristic among the audio input units, the constant filtering calibration scheme being estimated from an average value of a ratio of a desired signal to a reference signal among the plurality of signals output by the plurality of audio input units; and removing noise from the signals to which the constant filtering calibration scheme has been applied.

12. The microphone signal compensation method of claim 11, wherein the desired signal is a first signal output by a first audio input unit among the plurality of audio input units;

the reference signal is an I-th signal output by an I-th audio input unit among the plurality of audio input units; and the selectively applying of the constant filtering calibration scheme comprises applying, to the I-th signal, a constant filtering calibration scheme represented by the following equation:

$$H_l^{fdc1}(k) = \frac{1}{M}\sum_{m=1}^{M}\frac{X_1(k,m)}{X_l(k,m)}$$

where H(k) denotes the selectively applying of the constant filtering calibration scheme, M denotes a number of frames, $X_1(k, m)$ denotes the first signal, $X_l(k, m)$ denotes the I-th signal, and I≠1.

13. The microphone signal compensation method of claim 11, wherein the desired signal is an average signal of the plurality of signals output by the plurality of audio input units, and is represented by the following equation:

$$X_d = \frac{1}{L}\sum_{l=1}^{L}X_l(k,m)$$

where $X_d$ denotes the average signal, and L denotes a number of the signals represented by $X_1(k, m)$, $X_2(k, m)$, . . . , and $X_L(k, m)$; and the selectively applying of the constant filtering calibration scheme comprises applying, to an I-th signal, a constant filtering calibration scheme in which the reference signal is the I-th signal, and which is represented by the following equation:

$$H_l^{fdc2}(k) = \frac{1}{M}\sum_{m=1}^{M}\frac{X_d(k,m)}{X_l(k,m)}$$

where H(k) denotes the selectively applying of the constant filtering calibration scheme, M denotes a number of frames, $X_l(k, m)$ denotes the I-th signal, and I=1, 2, . . . , L.

14. The microphone signal compensation method of claim 11, wherein the constant filtering calibration scheme is determined by performing a training process in a frequency domain.

15. The microphone signal compensation method of claim 11, wherein each audio input unit of the plurality of audio input units comprises the microphone, an amplifier to amplify a signal received by the microphone, and an Analog-to-Digital Converter (ADC) to convert a signal output by the amplifier from an analog signal to a digital signal.

16. A non-transitory computer readable recording medium storing a program for controlling a computer to perform the microphone signal compensation method of claim 11.

* * * * *